Mar. 13, 1923.

H. MOCK

CONTAINER FOR ICE CREAM AND SIMILAR ARTICLES

Filed Mar. 14, 1918

1,448,077

Hugo Mock INVENTOR.

Patented Mar. 13, 1923.

1,448,077

UNITED STATES PATENT OFFICE.

HUGO MOCK, OF NEW YORK, N. Y.

CONTAINER FOR ICE CREAM AND SIMILAR ARTICLES.

Application filed March 14, 1918. Serial No. 222,341.

*To all whom it may concern:*

Be it known that I, HUGO MOCK, a citizen of the United States, residing at New York, in the county of New York and State of New York, have invented certain new and useful Improvements in Containers for Ice Cream and Similar Articles, of which the following is a specification.

This improvement relates to containers, and has for its particular object the provision of a container or package for ice cream which will obviate the necessity of using ice in the delivery of retail quantities of ice cream.

A further object of this invention is the provision of a container which is not bulky in volume, and which is adapted to keep articles of food in a cold condition without the necessity of packing same with ice. Further objects of my invention will be apparent from the drawings, in which—

Figure 1:
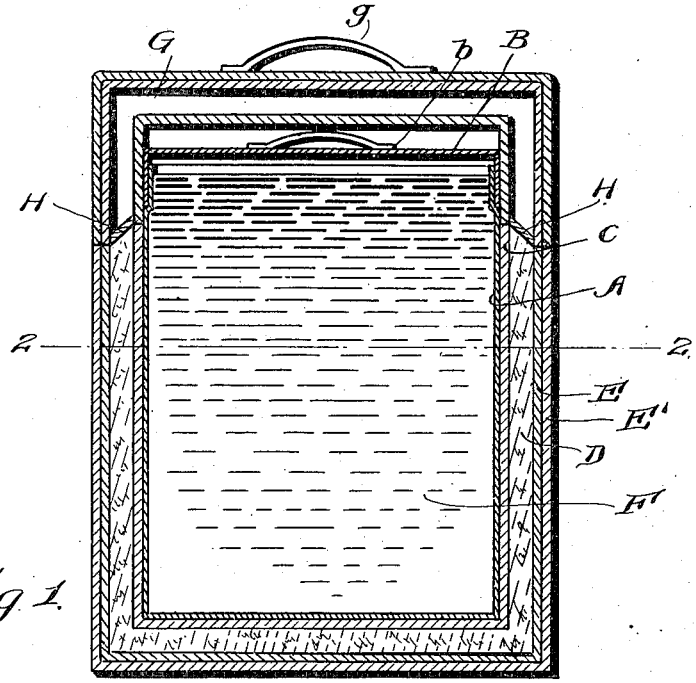

Fig. 1 presents a vertical section of the container with a package of ice cream therein.

Figure 2:
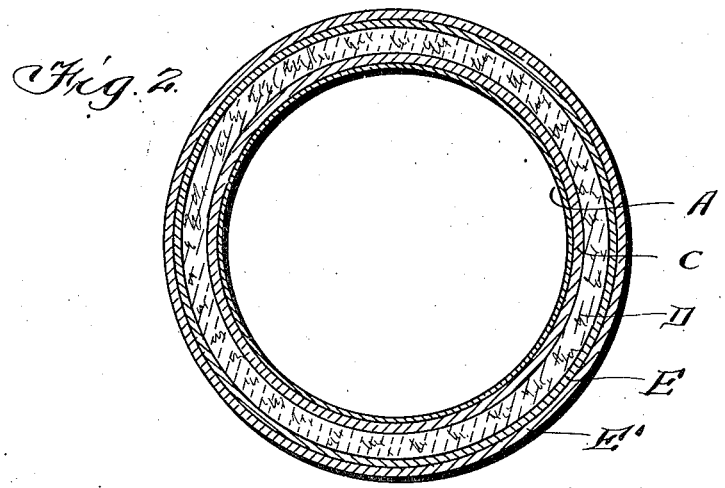

Fig. 2 presents a cross section on the line 2—2 of the same container.

In the drawings A represents a metal container for ice cream with the ice cream F solidly packed therein, and having the offset cover B with a handle b. Around this metallic container is placed a layer C of felt, corrugated paper or other good non-conductor of heat. Adjacent this layer of felt is a solid, relatively thick layer of a non-conductor of heat D, and outside of this are a number of layers E and E' of non-conducting felt or other cellular or fibrous heat insulating material.

To prevent the loss of heat through the top of the container G, same is made of corresponding layers of felt, solid non-conductor and outside felt, the same as the outer covering E, E' of the body of the container, the base of the top H being closed by a non-conducting material of wood or of a similar nature, so that no heat can travel from the inside of the container to the outside. For convenience in carrying, the top has a handle g.

The essence of this invention lies in the employment of the solid, non-heat conducting material D, which should, beside its heat insulating property, have a high specific heat, so that it will take a relatively large amount of heat to raise the temperature of the body D several degrees. For this purpose I have found a material such as molten or powdered sulphur most desirable. Another material equally useful for this purpose but not as desirable on account of expense is hard rubber. Materials unsuitable are metals which are good conductors of heat and do not have a sufficiently high specific heat, and many non-conductors of heat would be unsuitable for this filling, such as cotton, wool, mineral wool, powdered magnesia, etc., as these bodies, while sufficiently good non-conductors, have insufficient thermal capacity per unit of volume.

It will be observed that the quantity of solid insulating material is also important as to take advantage of the high thermal capacity per unit of volume of the material used, a sufficient quantity of said material must be employed in relation to the body to be insulated as a small quantity of material having a high thermal capacity per unit of volume would be unsatisfactory.

In the use of this invention, the container should be previously refrigerated as well as the ice cream to be conserved, so that when the container having the ice cream therein is put into the package, the body D is thoroughly chilled to a temperature equal to, or below that of the ice cream. After the ice cream is in the package, the cover is put on, and the container with the ice cream therein can then be delivered and the ice cream will maintain its frozen condition without melting for a long time without the aid of any packing of ice around the package.

It is obvious that the larger the volume of solid material D is used and the lower the initial temperature at which the ice cream is put into the container, the better will be the results. In the cover G the space between the two thin linings may be filled with the material D, or may be left merely as a dead air space. In this form of container it is also desirable that the outside fibrous, insulating layers E and E' should be thicker than the inside layer of felt C, as the use of an insulating felt between the metallic container and the body D is relatively unimportant.

Although I have shown but one embodiment of my invention, it is obvious that the same principle can be applied to milk cans and to containers for keeping bodies warm as well as cold.

I am aware that it is old in the art to use various layers of insulating material to keep bodies cold, but I believe it is new to use a solid insulating layer having a predetermined thermal capacity and specific heat in relation to the body to be insulated.

What I claim is:

1. In a heat insulating device, the combination of a container for the material to be insulated, a thick body of sulphur surrounding said container, a fibrous heat insulator surrounding said sulphur, a casing for the said fibrous heat insulator, and a cover for said device, said cover being adapted to insulate the walls of said device from each other.

2. In a heat insulating device, a container for the material to be insulated and a thick layer of fused sulphur surrounding said container, the thermal capacity and latent heat of said sulphur having a definite relation to the amount of material to be insulated.

3. In a heat insulating device, a container for the material to be insulated and a thick layer of sulphur surrounding said container, the thermal capacity and latent heat of said sulphur having a definite relation to the amount of material to be insulated.

4. In a heat insulating device, the combination of a container for the material to be insulated, a thick body of solid fused sulphur surrounding said container, a porous heat insulator surrounding said sulphur, a casing for said porous heat insulator and a non-conducting cover adapted to seal said device and to insulate the various walls of the device from each other.

5. In a heat insulating device, the combination of a container for the material to be insulated and a layer of sulphur surrounding said container, the layer of sulphur being sufficiently large so that its latent heat or cold will keep the material in the container at a relatively even temperature for a number of hours.

6. In a heat insulating device, the combination of a container for the material to be insulated, a thick body of sulphur surrounding said container, a fibrous heat insulator surrounding said sulphur, a casing for the said fibrous heat insulator, and a cover for said device, said cover being adapted to insulate the walls of said device from each other.

In testimony whereof I hereunto affix my signature.

HUGO MOCK.